United States Patent
Srivastava et al.

(10) Patent No.: US 11,153,784 B2
(45) Date of Patent: *Oct. 19, 2021

(54) ULTRA-RELIABLE LOW LATENCY COMMUNICATIONS (URLLC) PRESERVATION DURING HANDOVERS

(71) Applicant: Cisco Technology, Inc., San Jose, CA (US)

(72) Inventors: Vimal Srivastava, Bangalore (IN); Timothy Peter Stammers, Raleigh, NC (US); Aeneas Sean Dodd-Noble, Andover, MA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,770

(22) Filed: Jan. 27, 2020

(65) Prior Publication Data

US 2021/0045013 A1 Feb. 11, 2021

Related U.S. Application Data

(63) Continuation of application No. 16/535,513, filed on Aug. 8, 2019, now Pat. No. 10,588,052.

(51) Int. Cl.
*H04W 28/12* (2009.01)
*H04W 76/10* (2018.01)
(52) U.S. Cl.
CPC .......... *H04W 28/12* (2013.01); *H04W 76/10* (2018.02)
(58) Field of Classification Search
CPC .................................................... H04L 12/28
(Continued)

(56) References Cited

U.S. PATENT DOCUMENTS

2018/0035332 A1 2/2018 Agiwal et al.
2018/0302918 A1 10/2018 Shaheen
(Continued)

FOREIGN PATENT DOCUMENTS

WO 2018129325 A1 7/2018

OTHER PUBLICATIONS

ETSI, "5G; System Architecture for the 5G System", 3GPP TS 23.501 version 15.2.0 Release 15, ETSI TS 123 501 V15.2.0, Jun. 2018, 219 pages.

(Continued)

*Primary Examiner* — Dang T Ton
(74) *Attorney, Agent, or Firm* — Edell, Shapiro & Finnan, LLC

(57) ABSTRACT

A control plane of a network, including radios of a radio access network controlled by the control plane and user plane functions controlled by the control plane, establishes first and second protocol data unit (PDU) connections each to handle the same flows of traffic for ultra-reliable low latency communications (URLLC) from user equipment to a data network through first and second source radios, respectively. Due to mobility of the user equipment, the control plane relocates the flows from the first and second source radios to first and second target radios, respectively. To relocate the flows, the control plane receives from the first target radio a notification that identifies flows that cannot be activated on the first target radio. In response to the notification, the control plane commands the first target radio to prioritize the flows that cannot be activated above remaining ones of the flows.

20 Claims, 7 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0316395 A1 | 11/2018 | Sundararajan et al. |
| 2019/0037417 A1 | 1/2019 | Lei et al. |
| 2019/0045529 A1 | 2/2019 | Xiong et al. |
| 2020/0314701 A1* | 10/2020 | Talebi Fard ...... H04W 36/0033 |

OTHER PUBLICATIONS

Cisco, "Cisco Ultra 5G Packet Core Solution", C11-740360-00, Feb. 2018, 11 pages.

* cited by examiner

ULTRA-RELIABLE LOW LATENCY COMMUNICATIONS (URLLC) PRESERVATION DURING HANDOVERS

CROSS-REFERENCE TO RELATED APPLICATIONS

This application is a continuation of U.S. patent application Ser. No. 16/535,513, filed Aug. 8, 2019, the entirety of which is incorporated herein by reference.

TECHNICAL FIELD

The present disclosure relates to preserving URLLC during handover procedures performed in a 3GPP 5G network.

BACKGROUND

Ultra Reliability and Low Latency Communication (URLLC) is a study item in 3GPP (Technical Report (TR) 23.725). To ensure high reliability, transmission in 3GPP 5G (referred to simply as "5G") may be supported. Also, depending on conditions of a network deployment, where network functions or segments cannot meet requirements of reliability, redundant transmission may be applied on a data plane path between user equipment (UE) and a data network. Multiple solutions have been offered for providing high reliability message delivery for use cases related to normal protocol data unit (PDU) connections. One solution in 3GPP 5G for URLLC creates two independent disjointed PDU connections by the UE through redundant source radios towards the same data network. Using the two PDU connections, the UE receives duplicate packets for the same flows of traffic supported by each of the PDU connections and, if some packets are dropped due to network problems, the UE still receives at least one copy of the packets due to the redundant PDU connections. Due to UE mobility, i.e., when the UE moves, the PDU connections and the flows of traffic may need to be relocated or handed over from the redundant source radios to redundant target radios. The target radios may not have sufficient resources to support all of the traffic flows from the source radios, which may result in one or more of the flows of traffic being dropped; this defeats the purpose of URLLC.

DESCRIPTION OF EXAMPLE EMBODIMENTS

Overview

A control plane of a network including radios of a radio access network controlled by the control plane and user plane functions controlled by the control plane, performs a method. In the method, the control plane establishes first and second protocol data unit (PDU) connections each to handle the same flows of traffic for ultra-reliable low latency communications (URLLC) from user equipment to a data network through a first source radio and a second source radio, respectively. Due to mobility of the user equipment, the control plane relocates the flows from the first source radio and the second source radio to a first target radio and a second target radio, respectively. To relocate the flows, the control plane receives from the first target radio a notification that identifies one or more of the flows that cannot be activated on the first target radio. In response to the notification, the control plane commands the first target radio to prioritize the one or more of the flows above remaining ones of the flows, to cause the first target radio to initially activate the one or more of the flows on the second target radio, and to then activate the remaining ones of the flows on the second target radio.

Example Embodiments

Figure 1:
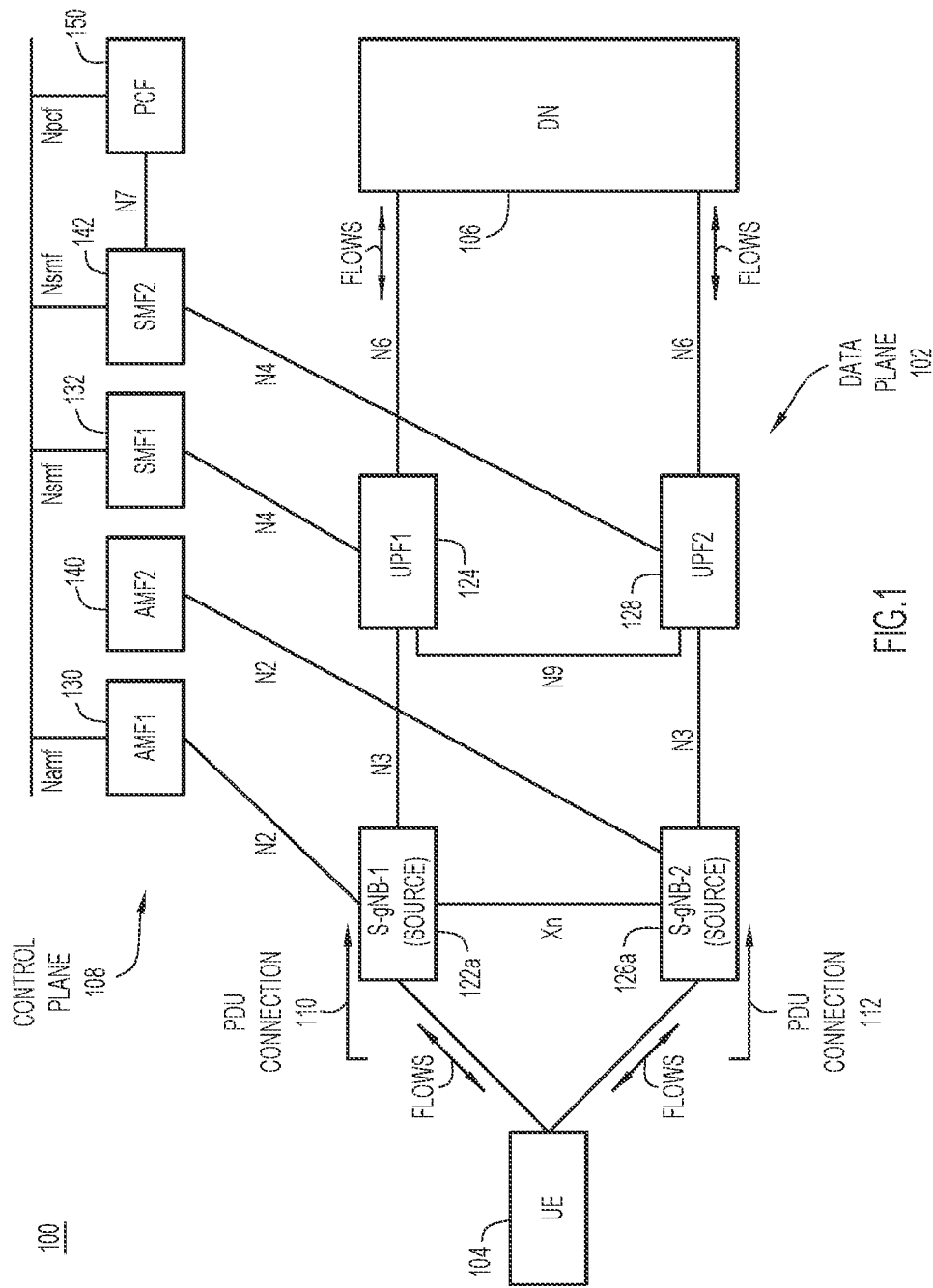
FIG. 1 is a block diagram of an example 3GPP 5G (i.e., "5G") network that uses redundant data plane paths based on dual connectivity to achieve ultra reliability and low latency communication (URLLC), according to an example embodiment.

With reference to FIG. 1, there is a block diagram of an example 3GPP 5G (simply "5G") network 100 that uses redundant data plane paths based on dual connectivity to achieve ultra-reliability and low latency communication (URLLC). Network 100 includes a data plane 102 (also referred to as a user plane 102) to convey flows of traffic from user equipment (UE) 104 to a data network (DN) 106, and a control plane 108 to manage/control the data plane. Data network 106 may include one or more local area networks (LANs) and one or more wide area networks (WANs), such as the Internet.

Data plane 102 supports first and second independent, disjointed, concurrent, and redundant protocol data unit (PDU) connections or sessions 110 (PDU1) and 112 (PDU2) from UE 104 to data network 106 to achieve URLLC. PDU connections 110 and 112 each support the same/redundant flows of traffic, i.e., copies of the same flows of traffic flow through both PDU connections. Thus, UE 104 receives duplicate flows of packets over PDU connections 110 and 112, such that when packets are dropped on one of the PDU connections due to network problems, the UE continues to receive at least one copy of the dropped packets over the other one of the PDU connections due to redundancy of the packets, to achieve URLLC. UE 104 may include a redundancy handler function (RHF) to de-duplicate the packets. The terms "PDU connection" and "PDU session" are synonymous and may be used interchangeable.

In data plane 102, first PDU connection 110 includes a first radio 122a connected/attached to UE 104 over a wireless link, and a first user plane function (UPF) 124 (hereinafter UPF1) connected to the first radio and to data network 106 over a first N3 interface and a first N6 interface, respectively. Second PDU connection 112 includes a second radio 126a connected/attached to UE 104 over a second N3 interface, and a second user plane function 128 (hereinafter UPF2) connected to the second radio and to data network 106 over a second N3 interface and a second N6 interface, respectively. Radios 122a and 126a communicate with each other over one or more Xn interfaces. For the 5G example, radios 122a and 126a may each be a respective next generation nodeB (gNB), for example, that forms part of a radio access network (RAN) by which UE 104 accesses UPF1 and UPF2. In the ensuing description, first radio 122a is referred to as source (S)-gNB-1 (S-gNB-1) and second radio 126a is referred to as S-gNB-2. The "S-" prefix indicates that the gNBs are "source" gNBs in the context of a handover procedure from source gNBs to "target" gNBs, which are labeled with a "T-" prefix, as described below.

Control plane 108 includes a collection of functions or applications hosted on one or more servers, for example, that collectively control data plane 102 in accordance with one or more 5G standards. More specifically, control plane 108 includes a first access and mobility management function (AMF) 130 (hereinafter AMF1) and a first session management function (SMF) 132 (hereinafter SMF1) collectively associated with first PDU connection 110. AMF1 communicates with S-gNB-1 over a first N2 interface that carries control signaling, and SMF1 communicates with UPF1 over a first N4 interface that carries control signaling. Control plane 108 also includes a second AMF 140 (hereinafter AMF2) and a second SMF 142 (hereinafter SMF2) collectively associated with PDU connection 112. AMF2 communicates with S-gNB-2 over a second N2 interface that carries control signaling, and SMF2 communicates with UPF2 over a second N4 interface that carries control signaling. Control plane 108 also includes a policy control function (PCF) 150 configured to communicate with SMFs SMF1 and SMF2, and with AMFs AMF1 and AMF2.

Each AMF (e.g., each of AMF1 and AMF2) may support termination of non-access stratum (NAS) signaling, and NAS ciphering and integrity protection. Each AMF may support registration management, PDU connection/session management, and/or mobility management. Each AMF may also support access, authentication, and authorization (AAA) and/or security context management. Each AMF may communicate with other control plane functions of control plane 108 via a respective Namf interface.

Each SMF (e.g., SMF1 and SMF2) may support PDU connection/session establishment, modification, and/or release. Each SMF may also allocate and manage the allocation of an internet protocol (IP) address to UE 104, and may support dynamic host configuration protocol (DHCP) functions. Each SMF may select and control a corresponding UPF (e.g., UPF1 or UPF2) for data transfer. Each SMF may support termination of NAS signaling related to session management, and may support traffic steering configuration for UPFs UPF1 and UPF2. Each SMF may communicate with other control plane functions of control plane 108 over respective Nsmf interfaces.

UPFs UPF1 and UPF2 each communicate control signaling with corresponding ones of SMF1 and SMF2 over corresponding ones of N4 interfaces, as mentioned above. UPF1 and UPF2 communicate control signaling with each other using one or more N9 interfaces. As mentioned above, each UPF (e.g., UPF1 and UPF2) may communicate data signaling with S-gNB-1 and T-gNB-2 over respective N3 interfaces. Each UPF may support data packet routing and forwarding for flows of traffic, and packet inspection. Each UPF supports handling of quality of service (QoS) flows of traffic. Each UPF acts as an external protocol data unit (PDU) session point of interconnect to data network 106. Each UPF may communicate data signaling with data network 106 over a respective N6 interface. Each UPF may serve as an anchor point for mobility with respect to UE 104.

PCF 150 provides policy rules to other control plane functions, such as the SMFs and the AMFs. PCF 150 may also provide access subscription information for policy decisions in a unified data repository, for example. PCF 150 communicates control signaling with SMFs SMF1 and SMF2 over respective N7 interfaces. PCF 150 communicates with AMFs AMF1 and AMF2 over an Npcf interface.

In operation for URLLC, PDU connections 110 and 112 carry duplicate flows of traffic between UE 104 and data network 106, as described above. Due to UE mobility, i.e., when UE 104 moves out of range of S-gNB-1 and S-gNB-2, network 100 performs a handover procedure to relocate or handover PDU connections 110 and 112 and their respective same flows of traffic from S-gNB-1 and S-gNB-2 to new gNBs in range of the UE. Specifically, network 100 attempts to relocate (i) the flows from S-gNB-1 to a new gNB, referred to as "T-gNB-1," and (ii) the flows from S-gNB-2 to a new gNB, referred to as T-gNB-2. In the aforementioned scenario, S-gNB-1 and S-gNB-2 are referred to as source gNBs, and T-gNB-1 and T-gNB-2 are referred to as target gNBs, as the handover procedure attempts to relocate respective flows from source gNBs S-gNB-1, S-gNB-2 to target gNBs T-gNB-1, T-gNB-2. The process of relocating or handing-over the flows from the source gNBs to the target gNBs is also referred to as "relocating the source gNBs to the target gNBs."

Figure 2:
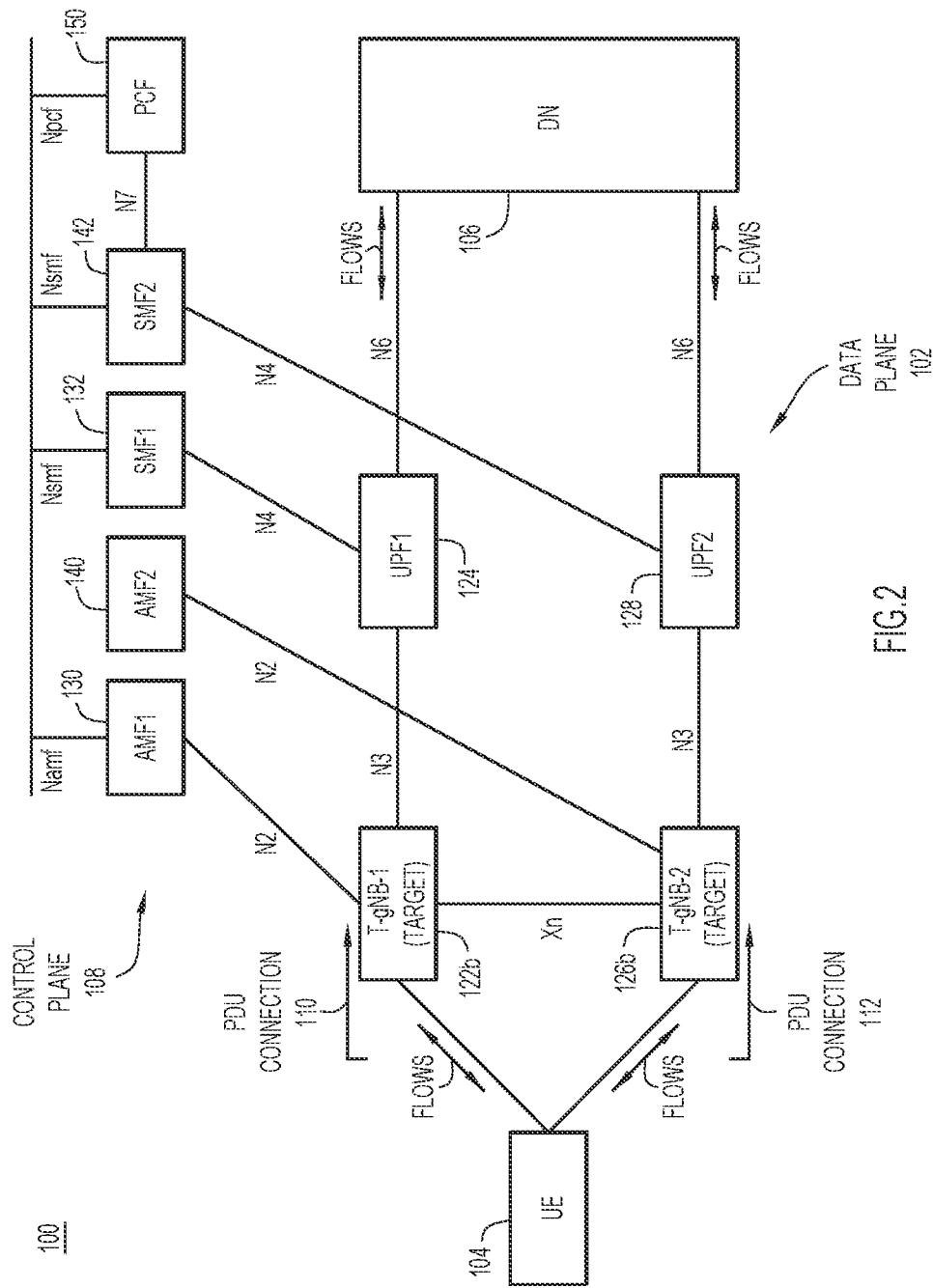
FIG. 2 is a block diagram of the 5G network after a handover procedure due to user equipment mobility has been completed, according to an example embodiment.

With reference to FIG. 2, there is block diagram of 5G network 100 after the above described handover procedure. As shown, the main difference between FIG. 1 and FIG. 2 is that, for PDU connections 110 and 112, source gNBs S-gNB-1 and S-gNB-2 of FIG. 1 have been replaced by target gNBs T-gNB-1 (also labeled 122b) and T-gNB-2 (also labeled 126b) of FIG. 2, respectively. In FIG. 2, target gNBs T-gNB-1 and T-gNB-2 essentially maintain the same interfaces as their counterparts with respect to components/functions of data plane 102 (e.g., UPF1 and UPF2) and control plane 108 (e.g., (AMF1, SMF1) and (AMF2 and SMF2)).

During the handover procedure, each source gNB attempts to move all of its flows to the corresponding target gNB, i.e., attempts to activate all of its flows on the corresponding target gNB. The target gNB applies admission control on/to the flows being relocated from the source gNB and reserves resources to accept and support the flows. If admission control determines that the target gNB does not have enough resources to accept/support all of the flows, i.e., does not have enough resources to accept some of the flows, the target gNB may not activate the some of the flows, which results in the some of the flows not being available to UE 104 after the handover procedure is completed. When the handover procedure attempts to relocate duplicate flows from both source gNBs to both target gNBs, there is a possibility that both target gNBs will reject one or more of the same flows during admission control due to a resource crunch/reservation failure. The result is that one or more of the same flows may not be relocated successfully to either of the source gNBs, and thus not be available to UE 104, which disadvantageously breaks the URLLC.

Figure 3:
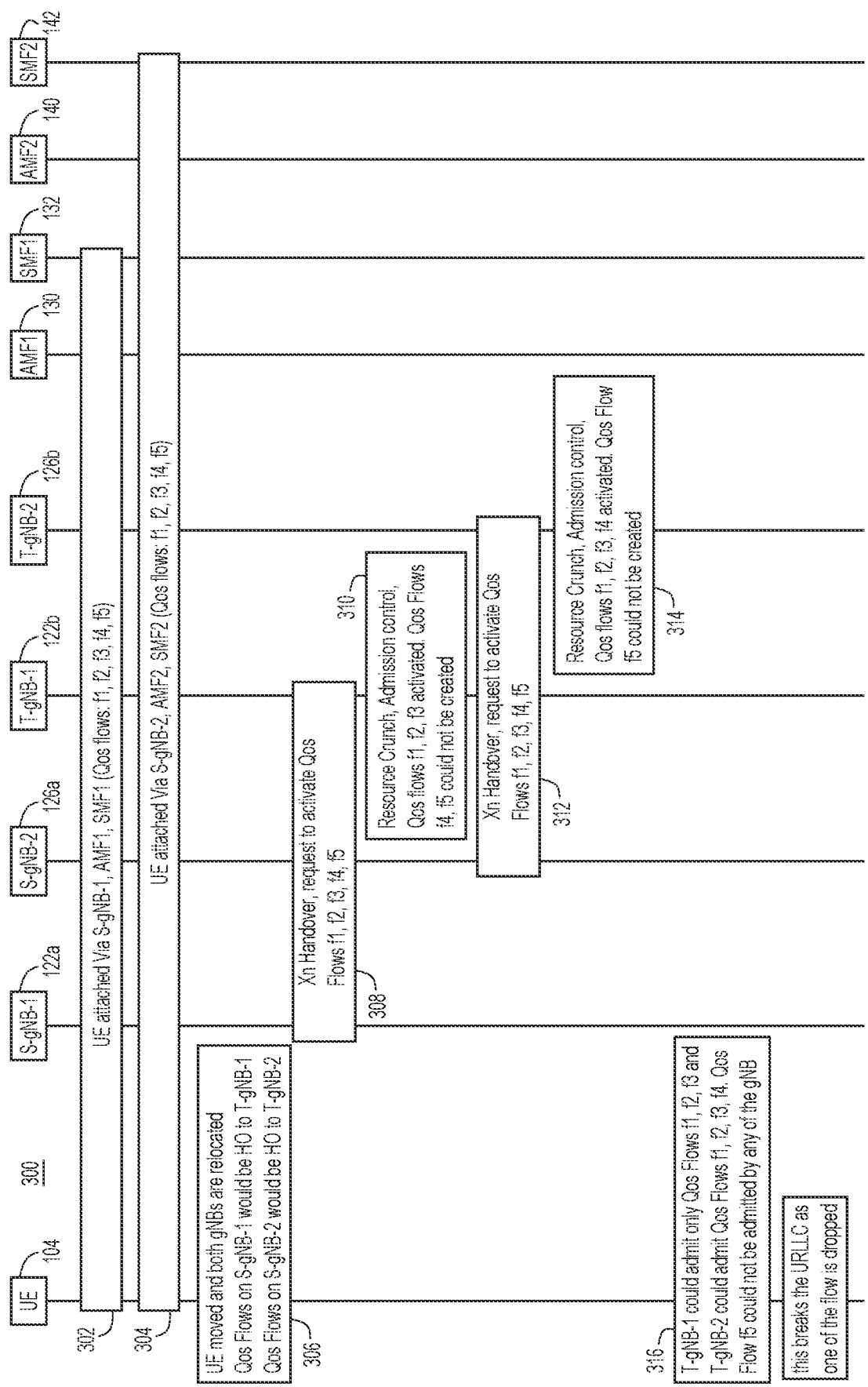
FIG. 3 is a high-level transaction diagram for the 5G network that shows failure of URLLC with respect to flows of traffic after the handover procedure, according to an example embodiment.

With reference to FIG. 3, there is an example high-level transaction diagram 300 for network 100 that shows the above-described problem with respect to specific flows. In FIG. 3, UPFs UPF1 and UPF2 are omitted for the sake of clarity.

At 302, UE 104 establishes PDU connection 110 through S-gNB-1, AMF1, and SMF1. PDU connection 110 supports Quality-of-Service (QoS) flows f1-f5, as defined under one or more 5G standards.

At 304, UE 104 establishes PDU connection 112 through S-gNB-2, AMF2, and SMF2. PDU connection 112 also supports QoS flows f1-f5 as duplicate or redundant flows.

At 306, due to UE mobility, a handover procedure is initiated to relocate all flows from source S-gNB-1 to target T-gNB-1, and to relocate all flows from source S-gNB-2 to target T-gNB-2. Source S-gNB-1 and target T-gNB-1 are homed (HO) to, or anchored, on SMF1 (so source S-gNB-1 is handed over to T-gNB-1), while source S-gNB-2 and target T-gNB-2 are homed to SMF2 (so source S-gNB-2 is handed over to T-gNB-2). The handover procedure includes operations 308-314, described below.

At 308, S-gNB-1 requests T-gNB-1 to activate flows f1-f5. For example, S-gNB-1 sends to T-gNB-1 a handover request identifying flows f1-f5.

At 310, responsive to the request, T-gNB-1 performs admission control against flows f1-f5 and, due to a resource crunch (i.e., constraint) at T-gNB-1, T-gNB-1 only activates flows f1-f3. T-gNB-1 does not activate/create flows f4, f5.

At 312, S-gNB-2 requests T-gNB-2 to activate flows f1-f5.

At 314, responsive to the request, T-gNB-2 performs admission control against flows f1-f5 and, due to a resource crunch at T-gNB-2, T-gNB-2 only activates flows f1-f4. T-gNB-2 does not activate flow f5.

At 316, when the handover procedure is completed, T-gNB-1 has admitted only flows f1-f3, and T-gNB-2 has admitted only flows f1-f4. Flow f5 could not be admitted by either of the target gNBs, which breaks the URLLC due to a dropped flow.

Embodiments presented herein and described below solve the above-mentioned problem and achieve true URLLC in 5G after a handover procedure due to UE mobility. While the embodiments are based generally on one or more existing 5G standards, the embodiments represent an extension of, or modification to, the existing standards to achieve the URLLC after the handover procedure.

Figure 4A:
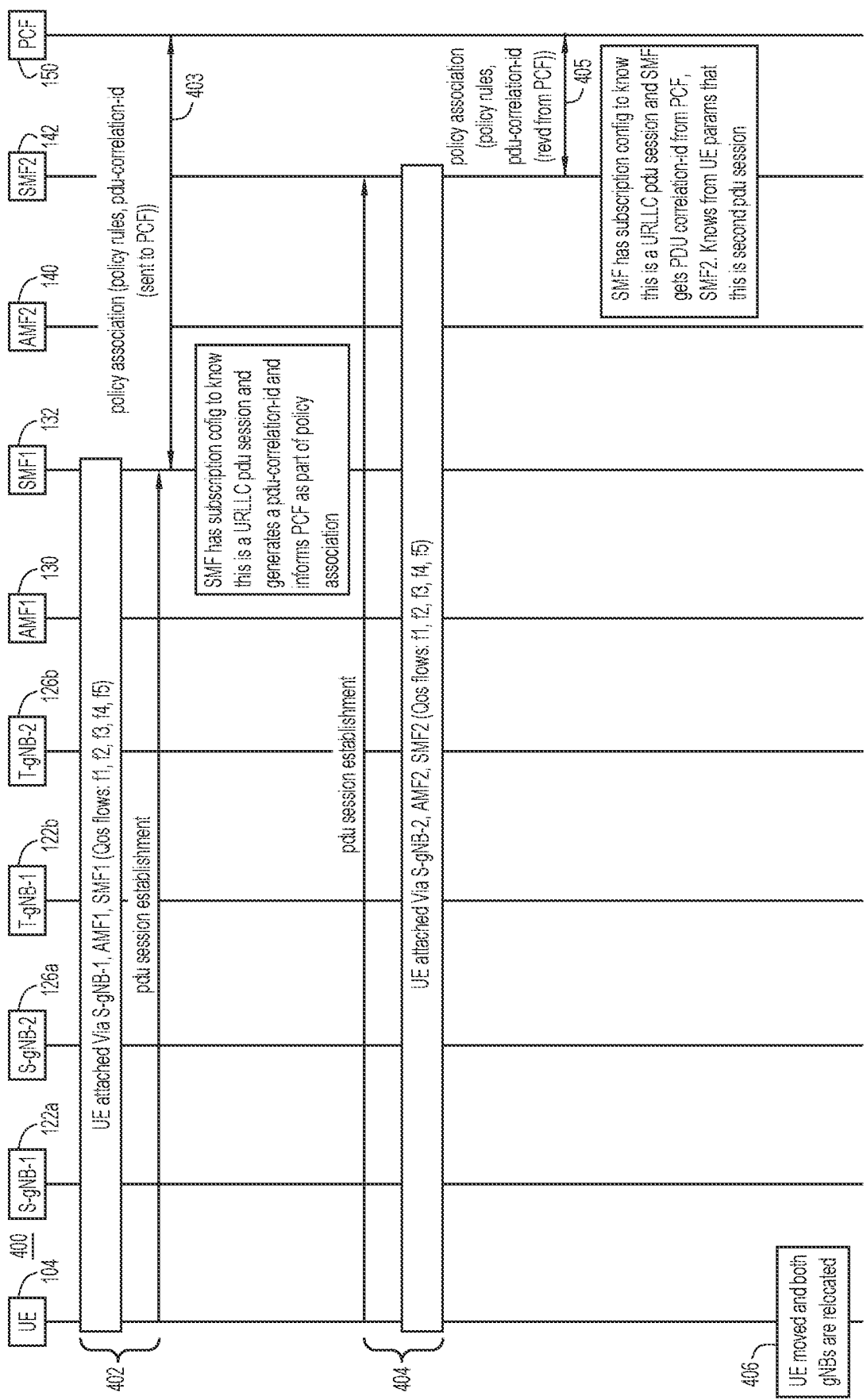
FIGS. 4A and 4B together represent a high-level transaction diagram for transactions performed in the 5G network that preserve URLLC after a handover procedure due to user equipment mobility, according to an example embodiment.
Figure 4B:
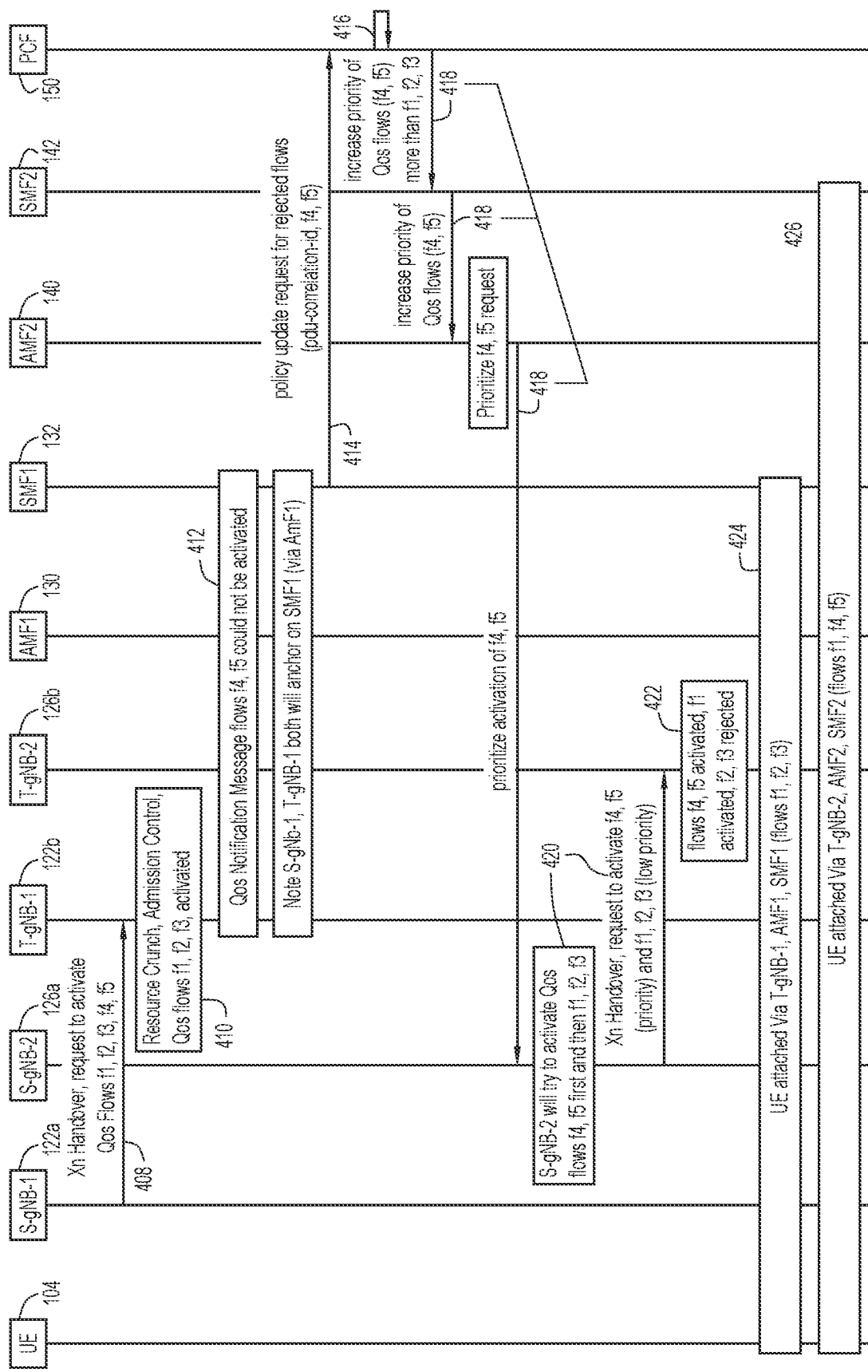

With reference to FIGS. 4A and 4B, there is an example high-level transaction diagram 400 of transactions performed in 5G network 100 to preserve URLLC after a handover procedure due to UE mobility, according to embodiments presented herein. It is assumed that a user data management function (UDM) (not shown in FIGS. 4A and 4B) of control plane 108 has a URLLC preservation configuration for PDU connections in a UE subscription profile. This means that URLLC preservation is enabled for UE 104 for a list of data network names (DNNs) including that for data network 106.

Referring first to FIG. 4A, at operations 402-404 described below, PDU connections 110 and 112 are established as a pair of connections that support URLLC. The PDU connections 110 and 112 each support redundant (i.e., copies of the same) QoS flows f1-f5. In the example of FIGS. 4A and 4B, flows f1-f5 are QoS flows as defined under 5G. Messages exchanged in and between data plane 102 and control plane 108 with respect to flows f1-f5 uniquely identify each flow and uniquely identify a QoS priority associated with each flow, as defined under one or more 5G standards.

At 402, UE 104 establishes PDU connection 110 through S-gNB-1, AMF1, and SMF1. PDU connection 110 supports flows f1-f5.

At 403, SMF1 accesses a subscription configuration stored in control plane 108 to determine that PDU connection 110 is part of a URLLC PDU connection that will include two PDU connections (e.g., PDU connections 110 and 112). In response, SMF1 generates a correlation identifier (id) ("correlation-id") that associates PDU connection 110 with PDU connection 112 (and the flows of PDU connection 110 with the redundant flows of PDU connection 112), so that, given an identifier of one of the PDU connections, the other one of the PDU connections can be identified from the correlation-id. SMF1 sends the correlation-id and an identifier of PDU connection 110 to PCF 150 to enable the PCF to associate PDU connection 110 with PDU connection 112, for purposes described below. The correlation-id is considered part of a policy association between the PDU connections.

At 404, UE 104 establishes PDU connection 112 through S-gNB-2, AMF2, and SMF2. PDU connection 112 also supports flows f1-f5 as duplicate or redundant flows.

At 405, SMF2 reports PDU connection 112, including context information for the PDU connection, to PCF 150. The context information may include session attributes, such as a subscription permanent identifier (SUPI), a DNN, and a redundancy sequence number (RSN). Based on the context information, PCF 150 determines that PDU connection 112 is related to already existing PDU connection 110 and, in response, the PCF sends the correlation-id from PDU connection 110 to SMF2. That is, SMF2 recognizes from UE configuration parameters and the context information received when PDU connection 112 was established that PDU connection 112 is the second PDU connection for the URLLC, and from the correlation-id that PDU connection 112 is associated with PDU connection 110. The correlation-id may include a tuple, e.g., (PDU1, PDU2), identifying the associated PDU connections (110, 112), and their respective flows.

At 406, due to UE mobility, a handover procedure is initiated to relocate flows on source S-gNB-1 to target T-gNB-1, and to relocate flows on source S-gNB-2 to target T-gNB-2. The handover procedure includes operations 408-422, described below.

Referring to FIG. 4B, at 408, S-gNB-1 requests T-gNB-1 to activate flows f1-f5. For example, S-gNB-1 sends to T-gNB-1 a handover request identifying flows f1-f5 for activation.

At 410, responsive to the request, T-gNB-1 performs admission control against flows f1-f5 and, due to a resource crunch at T-gNB-1 (i.e., due to resource congestion at T-gNB-1), T-gNB-1 only activates flows f1-f3, and rejects flows f4, f5. T-gNB-1 does not activate flows f4, f5.

At 412, T-gNB-1 notifies SMF1 that flows f4, f5 could not be activated (i.e., were rejected). For example, T-gNB-1 sends to SMF1 a QoS notification message identifying flows f4, f5 as flows that were not activated on PDU connection 110.

At 414, responsive to the notification, SMF1 requests from PCF 150 a policy update for rejected flows f4, f5. For example, SMF1 sends to PCF 150 a policy update request identifying flows f4, f5 that could not be activated, a PDU connection identifier for PDU connection 110 (PDU1), and the correlation-id.

At 416, responsive to information in the policy update request from SMF1 indicating that flows f4, f5 were rejected for PDU connection 110, and that PDU connection 110 is associated with PDU connection 112 as indicated by the correlation-id, PCF 150 prioritizes flows f4, f5 over remaining flows f1-f3 for PDU connection 112 to compensate for the previous rejection of flows f4, f5 on PDU connection 110. In other words, flows f4, f5 were rejected on PDU connection 110, so PCF 150 increases the priority of flows f4, f5 over the priority of flows f1-f3 on PDU connection 112. In this way, for PDU connection 112, flows f4, f5 become high priority flows, while flows f1-f3 become low priority flows. Because PDU connections 110 and 112 are independent of each other, the correlation-id is a mechanism used to link the PDU connections together.

At 418, based on determinations made at 416, PCF 150 takes action to ensure that second PDU connection 112 will activate prioritized flows f4, f5 rejected by first PDU connection 110. To do this, PCF 150 commands/notifies S-gNB-2 to prioritize flows f4, f5 above flows f1-f3 in a handover request from S-gNB-2 to T-gNB-2. In the example of FIGS. 4A and 4B, PCF 150 sends an increase priority command identifying the increased priority flows f4, f5 to S-gNB-2 via SMF2 and AMF2. The increase priority command uniquely identifies each flow f4, f5 as high (QoS) priority, and each flow f1-f3 as low (QoS) priority, which is lower than the high (QoS) priority.

At 420, responsive to the increase priority command, S-gNB-2 requests T-gNB-2 to activate high priority flows f4, f5 first, and then to activate low priority flows f1-f3. For example, S-gNB-2 may send to T-gNB-2 a handover request to activate flows and that indicates that flows f4, f5 are high priority flows and flows f1-f3 are low priority flows. Alternatively, S-gNB-2 may send a sequence of handover requests, including a first handover request to activate high priority flows f4, f5 followed by a second handover request to activate low priority flows f1-f3.

At 422, responsive to the handover request(s) from 420, T-gNB-2 performs admission control and, due to a resource crunch, activates high priority flows f4, f5, then activates low priority flow f1, but rejects low priority flows f2, f3. That is, T-gNB-2 only activates flows f1, f4, f5. T-gNB-2 does not activate flows f2, f3.

At 424, the above handover procedure operations establish PDU connection 110 via T-gNB-1, AMF1, SMF1, such that the PDU connection supports only flows f1-f3.

At 426, the above handover procedure operations establish PDU connection 112 via T-gNB-1, AMF1, SMF1, such that the PDU connection supports only flows f1, f4, f5.

Accordingly, each and every one of flows f1-f5 is supported by at least one of PDU connections 110 and 112, and URLLC is preserved across flows f1-f5.

Figure 5:
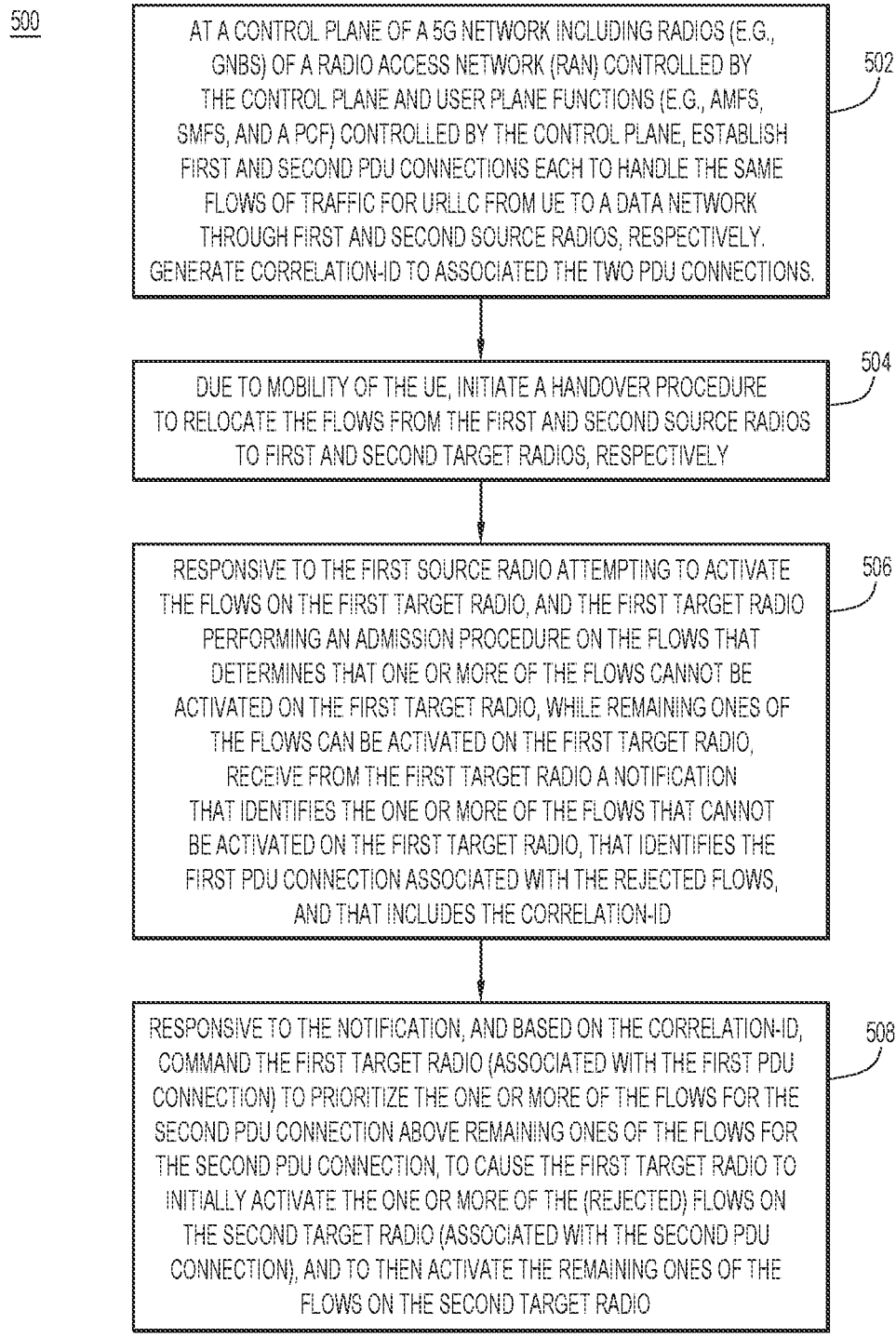
FIG. 5 is a flowchart of a method of preserving URLLC in a handover procedure performed in the 5G network due to user equipment mobility.

With reference to FIG. 5, there is a flowchart of an example method 500 of preserving URLLC in a handover procedure performed in a 5G network 100 due to UE mobility. Method 500 includes operations described above in connection with FIGS. 4A and 4B. Method 500 is performed primarily by control plane 108 (i.e., by control plane function of the control plane) in concert with components of data plane 102.

At 502, control plane 108 establishes first and second PDU connections (e.g., PDU1 and PDU2) each to handle the same/redundant QoS flows of traffic (e.g., f1-f5) for URLLC from UE 104 to data network 106 through a first source radio (e.g., S-gNB-1) and a second source radio (e.g., S-gNB-2), respectively. This may include establishing the first PDU connection through the first source radio (e.g., S-gNB-1) under control of first control plane functions (e.g., AMF1, SMF1) of control plane 108, and establishing the second PDU connection (e.g., PDU2) through the second source radio (e.g., S-gNB-2) under control of second control plane functions (e.g., AMF2, SMF2) of the control plane. Also, control plane 108 (e.g., SMF1) generates a correlation identifier to associate the first PDU connection and its flows with the second PDU connection and its flows.

At 504, due to mobility of UE 104, control plane 108 initiates a handover procedure to relocate the flows from the first source radio (e.g., S-gNB-1) and the second source radio (e.g., S-gNB-2) to a first target radio (e.g., T-gNB-1) and a second target radio (e.g., T-gNB-2), respectively. The handover procedure includes further operations 506-508 described below.

At 506, responsive to the first source radio attempting to activate the flows on the first target radio, and the first target radio performing an admission procedure on the flows that determines that (i) one or more of the flows (i.e., a subset of the flows) cannot be activated on the first target radio (i.e., are rejected), while (ii) remaining ones of the flows (not in the subset) can be activated (i.e., are not rejected) on the first target radio, receiving from the first target radio a notification that identifies the one or more of the flows that cannot be activated on the first target radio. The notification also includes an identifier for the first PDU connection (i.e., that indicates that the rejected flows are from the first PDU connection), and the correlation identifier.

At 508, responsive to the notification, control plane 108 uses the correlation identifier to link the first PDU connection to the second PDU connection, and then, based on that linking, commands the first target radio to prioritize the one or more of the flows for the second PDU connection above the remaining ones of the flows for the second PDU connection, to cause the first target radio (associated with the first PDU connection) to initially activate the one or more of the flows on the second target radio (associated with the second PDU connection), and to then activate the remaining ones of the flows on the second target radio.

Figure 6:
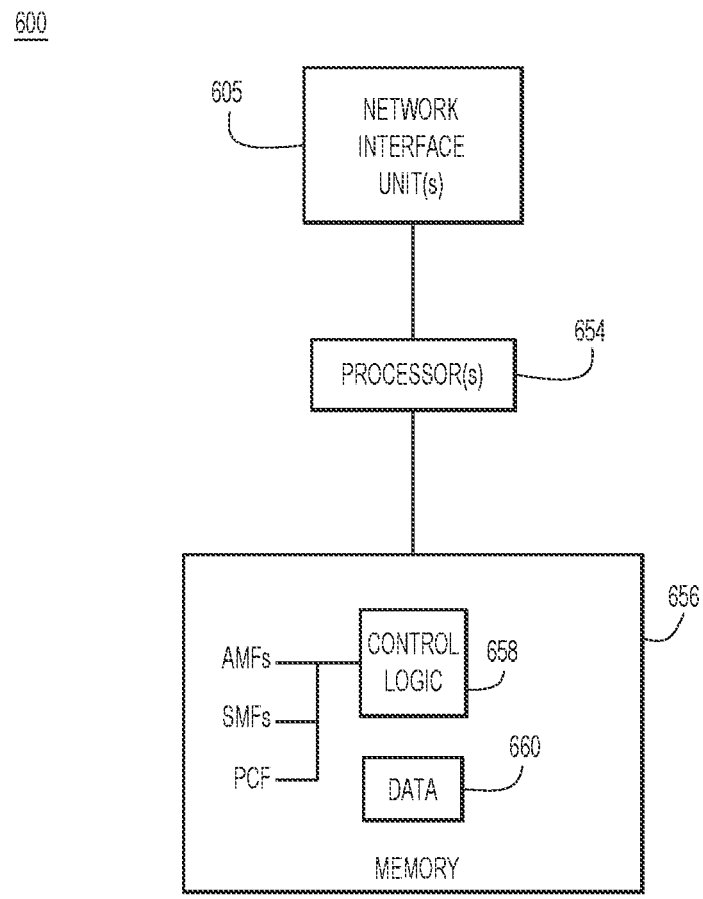
FIG. 6 is a block diagram of a computer device to host or implement a control plane of the 5G network, according to an example embodiment.

With reference to FIG. 6, there is a block diagram of an example computer device 600 that may host or implement control plane 108, i.e., host the functions of the control plane. For example, computer device 600 may take the form of one or more servers that host the functions of control plane 108. Computer device 600 includes one or more network interface unit(s) 605 to communicate with a wired and/or wireless communication network. Computer device 600 also includes a processor 654 (or multiple processors, which may be implemented as software or hardware processors), and memory 656. Network interface unit(s) 605 may include an Ethernet card with ports (or multiple such devices) to communicate over wired Ethernet links and/or a wireless communication card with a wireless transceiver to communicate over wireless links.

Memory 656 stores instructions for implementing methods described herein. Memory 656 may include read only memory (ROM), random access memory (RAM), magnetic disk storage media devices, optical storage media devices, flash memory devices, electrical, optical, or other physical/tangible (non-transitory) memory storage devices. The processor 654 is, for example, a microprocessor or a microcontroller that executes instructions stored in memory. Thus, in general, the memory 656 may comprise one or more tangible/non-transitory computer readable storage media (e.g., a memory device) encoded with software comprising computer executable instructions and when the software is executed (by the processor 654) it is operable to perform the operations described herein. Memory 656 stores control logic 658 to perform operations performed by control plane 108 described herein. For example, control logic may also store logic for AMFs AMF1 and AMF2, SMFs SMF1 and SMF2, and a PCF. The memory 656 may also store data 660 used and generated by logic 658. In an example, network interface unit(s) 605, processor(s) 654, control logic 658, and data 660 may be spread across multiple servers that communicate with each other via the network interface units.

In summary, embodiments presented herein preserver URLLC in a handover procedure due to user equipment mobility in a 5G network. For example, when user equipment moves such that both source gNBs are relocated, the 5G network prioritizes QoS flows such that if a first target gNB could not admit some flows, these flows are assigned high priority on a second target gNB, while flows that are activated on the first target gNB are assigned low priority (lower than the high priority) on the second target gNB. This ensures that all the flows are available at least on one of the target gNBs. In other words, the embodiments increase the priority of the rejected flows of the second PDU connection based on the rejected flows of the first PDU connection. The embodiments include a configuration in a UDM that indicates distributed QoS flows admission enablement along with URLLC configuration. The embodiments provide a correlation-id to be used to relate the two independent PDU connections (PDU1 and PDU2) to the same UE application for providing URLLC. Also, a first SMF associated with PDU1 notifies the PCF about rejected QoS flows for PDU1 and, in response, the PCF notifies a second SMF/AMF associated with PDU2 to prioritize QoS flows on PDU2, based on the correlation-id. This results in prioritization of rejected QoS flows for resource reservation on target gNB for PDU2. Currently, URRLC under the 3GPP 23.502 standard does not specify how two independent PDU sessions/connections can be correlated, so in the embodiments, the PDU-correlation-id is used to by network functions to understand the relation between the sessions, and allows reserving of the resources of the rejected flows first. Also, the standard does not include increasing the priority of the rejected flows of the second PDU session/connection, based on rejected flows of the first PDU session/connection. Also, in the standard, the PCF does not consider PDU session/connection correlation for Policy Controls. Moreover, with the existing hand-over (HO) procedures, the same QoS flows would be rejected on both the target gNBs, which the embodiments avoids.

Embodiments have been described in the context of a 5G network by way of example, only. It is understood that the embodiments apply equally to other types of networks defined, and that operate, according to standards other than the 5G standards. Such other types of network may also employ redundant connections and handovers from source nodes to target nodes due to user equipment mobility, to achieve reliable user equipment connectivity.

In summary, in one form, a method is provided comprising: at a control plane (i.e., at control plane functions of the control plane) of a network including a radio access network having radios controlled by the control plane and user plane functions controlled by the control plane: establishing first and second protocol data unit (PDU) connections each to handle the same flows of traffic for ultra-reliable low latency communications (URLLC) from user equipment to a data network through a first source radio and a second source radio, respectively; due to mobility of the user equipment, relocating the flows from the first source radio and the second source radio to a first target radio and a second target radio, respectively, the relocating including: receiving from the first target radio a notification that identifies one or more of the flows that cannot be activated on the first target radio; and responsive to the notification, commanding the first target radio to prioritize the one or more of the flows above remaining ones of the flows, to cause the first target radio to initially activate the one or more of the flows on the second target radio, and to then activate the remaining ones of the flows on the second target radio.

In another form, an apparatus is provided comprising: one or more network interface units; and one or more processors coupled to the one or more network interface units and configured to implement a control plane of a network including radios of a radio access network controlled by the control plane and user plane functions controlled by the control plane, the control plane configured to perform: establishing first and second protocol data unit (PDU) connections to handle the same flows of traffic for ultra-reliable low latency communications (URLLC) from user equipment to a data network through a first source radio and a second source radio, respectively; due to mobility of the user equipment, relocating the flows from the first source radio and the second source radio to a first target radio and a second target radio, respectively, the relocating including: receiving from the first target radio a notification that identifies one or more of the flows that cannot be activated on the first target radio; and responsive to the notification, commanding the first target radio to prioritize the one or more of the flows above remaining ones of the flows, to cause the first target radio to first activate the one or more of the flows on the second target radio, and to then activate the remaining ones of the flows on the second target radio.

In a further form, a non-transitory computer readable storage medium is provided. The One or more non-transitory computer readable media are encoded with instructions that, when executed by one or more processors, cause the one or more processors to implement a control plane of a network including a radio access network having radios controlled by the control plane and user plane functions controlled by the control plane, wherein the control plane is configured to perform: establishing first and second protocol data unit (PDU) connections each to handle the same flows of traffic for ultra-reliable low latency communications (URLLC) from user equipment to a data network through a first source radio and a second source radio, respectively; due to mobility of the user equipment, relocating the flows from the first source radio and the second source radio to a first target radio and a second target radio, respectively, the relocating including: receiving from the first target radio a notification that identifies one or more of the flows that cannot be activated on the first target radio; and responsive to the notification, commanding the first target radio to prioritize the one or more of the flows above remaining ones of the flows, to cause the first target radio to initially activate the one or more of the flows on the second target radio, and to then activate the remaining ones of the flows on the second target radio.

Although the techniques are illustrated and described herein as embodied in one or more specific examples, it is nevertheless not intended to be limited to the details shown, since various modifications and structural changes may be made within the scope and range of equivalents of the claim.

What is claimed is:

1. A method comprising:
   at a control plane of a network:
   establishing first and second protocol data unit (PDU) connections each to handle the same flows of traffic from user equipment to a data network through a first source radio and a second source radio, respectively; and
   relocating the flows from the first source radio and the second source radio to a first target radio and a second target radio, respectively, the relocating including commanding the first target radio to prioritize one or more of the flows that cannot be activated on the first target radio above remaining ones of the flows, to cause the first target radio to initially activate the one or more of the flows on the second target radio, and to then activate the remaining ones of the flows on the second target radio.

2. The method of claim 1, further comprising:
generating a correlation identifier to associate the first PDU connection with the second PDU connection;
associating the first PDU connection with the second PDU connection based on the correlation identifier; and
performing the commanding the first target radio based on the associating.

3. The method of claim 2, wherein the correlation identifier includes an identifier of the first PDU connection and an identifier of the second PDU connection, and indicates the flows handled by the first PDU connection and the second PDU connection.

4. The method of claim 2, further comprising:
accessing subscription information to determine that the first PDU connection and the second PDU connection are part of a ultra-reliable low latency communications (URLLC) PDU connection that includes redundant PDU connections; and
performing the generating the correlation identifier and the associating the first PDU connection with the second PDU connection as a result of the accessing.

5. The method of claim 1, wherein the relocating further includes:
receiving from the first target radio a notification that identifies the one or more of the flows that cannot be activated on the first target radio; and
performing the commanding responsive to the notification.

6. The method of claim 1, wherein the network is a 5G network as defined under one or more 5G standards, and the flows are each Quality-of-Service (QoS) flows as defined under the one or more 5G standards.

7. The method of claim 1, wherein the establishing includes:
establishing the first PDU connection through the first source radio under control of first control plane functions of the control plane; and
establishing the second PDU connection through the second source radio under control of second control plane functions of the control plane.

8. The method of claim 7, wherein the first control plane functions include a first access and mobility management function and a first session management function, and the second control plane functions include a second access and mobility management function and a second session management function.

9. The method of claim 1, wherein the network includes a radio access network, including the first source radio and the second source radio, controlled by the control plane and user plane functions controlled by the control plane.

10. An apparatus comprising:
one or more network interface units; and
one or more processors coupled to the one or more network interface units and configured to implement a control plane of a network, the one or more processors configured to perform operations including:
establishing first and second protocol data unit (PDU) connections each to handle the same flows of traffic from user equipment to a data network through a first source radio and a second source radio, respectively; and
relocating the flows from the first source radio and the second source radio to a first target radio and a second target radio, respectively, the relocating including commanding the first target radio to prioritize one or more of the flows that cannot be activated on the first target radio above remaining ones of the flows, to cause the first target radio to initially activate the one or more of the flows on the second target radio, and to then activate the remaining ones of the flows on the second target radio.

11. The apparatus of claim 10, wherein the one or more processors are further configured to perform:
generating a correlation identifier to associate the first PDU connection with the second PDU connection;
associating the first PDU connection with the second PDU connection based on the correlation identifier; and
performing the commanding the first target radio based on the associating.

12. The apparatus of claim 11, wherein the correlation identifier includes an identifier of the first PDU connection and an identifier of the second PDU connection, and indicates the flows handled by the first PDU connection and the second PDU connection.

13. The apparatus of claim 11, wherein the one or more processors are further configured to perform operations including:
accessing subscription information to determine that the first PDU connection and the second PDU connection are part of a ultra-reliable low latency communications (URLLC) PDU connection that includes redundant PDU connections; and
performing the generating the correlation identifier and the associating the first PDU connection with the second PDU connection as a result of the accessing.

14. The apparatus of claim 10, wherein the one or more processors are configured to perform the relocating by:
receiving from the first target radio a notification that identifies the one or more of the flows that cannot be activated on the first target radio; and
performing the commanding responsive to the notification.

15. The apparatus of claim 10, wherein the network is a 5G network as defined under one or more 5G standards, and the flows are each Quality-of-Service (QoS) flows as defined under the one or more 5G standards.

16. The apparatus of claim 10, wherein the one or more processors are configured to perform the establishing by:
establishing the first PDU connection through the first source radio under control of first control plane functions of the control plane; and
establishing the second PDU connection through the second source radio under control of second control plane functions of the control plane.

17. The apparatus of claim 16, wherein the first control plane functions include a first access and mobility management function and a first session management function, and the second control plane functions include a second access and mobility management function and a second session management function.

18. One or more non-transitory computer readable media encoded with instructions that, when executed by one or more processors, cause the one or more processors to implement a control plane of a network configured to perform operations including:

establishing first and second protocol data unit (PDU) connections each to handle the same flows of traffic from user equipment to a data network through a first source radio and a second source radio, respectively; and relocating the flows from the first source radio and the second source radio to a first target radio and a second target radio, respectively, the relocating including commanding the first target radio to prioritize one or more of the flows that cannot be activated on the first target radio above remaining ones of the flows, to cause the first target radio to initially activate the one or more of the flows on the second target radio, and to then activate the remaining ones of the flows on the second target radio.

19. The one or more non-transitory computer readable media of claim 18, wherein the control plane is further configured to perform operations including:

generating a correlation identifier to associate the first PDU connection with the second PDU connection;

associating the first PDU connection with the second PDU connection based on the correlation identifier; and performing the commanding the first target radio based on the associating.

20. The one or more non-transitory computer readable media of claim 19, wherein the correlation identifier includes an identifier of the first PDU connection and an identifier of the second PDU connection, and indicates the flows handled by the first PDU connection and the second PDU connection.

* * * * *